United States Patent [19]
Burlage et al.

[11] 4,374,426
[45] Feb. 15, 1983

[54] DIGITAL EQUALIZER FOR HIGH SPEED COMMUNICATION CHANNELS

[76] Inventors: Donald W. Burlage, 823 Tannahill Dr., Huntsville, Ala. 35802; Ronald C. Houts, 389 Woodland Hills, Tuscaloosa, Ala. 35405

[21] Appl. No.: 207,045

[22] Filed: Nov. 14, 1980

[51] Int. Cl.³ .......................................... G06F 15/31
[52] U.S. Cl. .................................................. 364/724
[58] Field of Search ...................... 364/724; 328/167

[56] References Cited

U.S. PATENT DOCUMENTS 3,777,130 12/1973 Croisier et al. ..................... 364/724
3,906,400 9/1975 Gooding et al. ................. 328/167 X
3,914,588 10/1975 Nussbaumer ......................... 364/724
3,987,288 10/1976 Franks .................................. 364/602

OTHER PUBLICATIONS

Tubiana, "Digital Filter", IBM Tech. Disclosure Bulletin, vol. 17, No. 9, Feb. 1975, pp. 2656-2658.
Schröder, "High Word-Rate Digital Filters With Programmable Table Lookup", IEEE Trans. on Circuits & Systems, May 1977, pp. 277-279.
DeMan et al., "High Speed NMOS Circuits for ROM-Accumulator and Multiplier Type Digital Filters", IEEE Journal of Solid-State Circuits, Oct. 1978, pp. 565-572.

Primary Examiner—David H. Malzahn
Attorney, Agent, or Firm—Nathan Edelberg; Robert P. Gibson; Freddie M. Bush

[57] ABSTRACT

A high speed digital equalizer provides a means for replacing the conventional transversal filter used to preset equalize a channel with simple digital circuits prior to data transmission. In particular, the analog to digital converter and digital multipliers of a transversal filter are replaced with a digital to analog converter and random access memory, respectively, which permits equalizers to be used with band limited channels operating at much higher data rates than previously possible because of sample rate limitations.

5 Claims, 6 Drawing Figures

DIGITAL EQUALIZER FOR HIGH SPEED COMMUNICATION CHANNELS

DEDICATORY CLAUSE

The invention described herein may be manufactured, used, and licensed by or for the Government for governmental purposes without the payment to us of any royalty thereon.

BACKGROUND OF THE INVENTION

In high speed communication channels the channel distorts transmitted pulses which in turn causes such problems as timing jitter and intersymbol interference. By predistorting a pulse, before it is acted upon by the channel, the channel effects can be compensated. Prior art techniques for equalization of binary data communication channels have employed some form of the non-recursive or transversal filter, a digital implementation of which is shown in FIG. 1. This equalizer has N multipliers 12, N−1 storage registers 14, an N input summer 16, and a analog to digital (A/D) converter 18. The multiplier coefficients $a_0, a_1, \ldots, a_{N-1}$ which determine the characteristics of the equalizer and therefore of the equalized channel, can be specified by any of a number of well established techniques.

Typical multiplier coefficient development is taught in the prior art references of "Principles of Data Communication" by R. W. Lucky, J. Salz, and E. J. Weldon, Jr., McGraw-Hill, Book Company 1968; pages 130-136 and "Applications of Linear Programming to the Time-Domain Design of Digital-Filter Equalizers" by D. W. Burlage and R. C. Houts, IEEE Transactions on Communications, Volume COM-21, No. 12, December 1973. Some techniques are adaptive in that the equalizer continues to adjust the multiplier coefficients during transmission of binary data to null some error criterion. Similar to the Burlage et al. article published by IEEE, a technical report by R. C. Houts and D. W. Burlage discloses substantially identical teachings but provides additional detail, as for example, typical programming fundamentals and subroutines useful in the design of digital filters. The technical report is "The Use of Linear Programming Techniques to Design Optimal Digital Filters for Pulse Shaping and Channel Equalization" published in April, 1972 as Technical Report Number 142-102 by the Communication System Group, Bureau of Engineering Research, University of Alabama.

The conventional preset equalizer of FIG. 1 is normally placed at the channel output with A/D converter 18 sampling at a rate of 1/T, which is referred to as the baud rate, and converting the analog sample to a C-bit digital word, C being the number of bits in each word of the equalizer. In conventional equalizers the baud rate typically equals the transmission rate $1/T_b$ of binary data over the channel. However, it has been shown by Houts et al (for example pages 68-81 of Chapter 4) that an improved equalizer takes B samples of the channel output for every binary data interval with B typically ranging from 2 to 5. Consequently, B represents the ratio of A/D converter sampling rate to the binary data rate, i.e., $B=T_b/T$ and the storage registers 14 of FIG. 1 span $M=N/B$ binary data intervals, where N is the length of a conventional equalizer.

Since the equalizer is a linear system, the placement of the equalizer at the transmitter or receiver is immaterial from a theoretical viewpoint. However, as is made apparent hereinbelow, a considerable savings in hardware circuitry can result from placing the equalizer at the channel input and taking advantage of the binary nature of the data source.

SUMMARY OF THE INVENTION

In high speed communication channels digital equalizers provide preset equalization of a channel prior to data transmission. For high speed operation the transversal filter comprises simple digital circuits for data processing. Channel input data is either processed through a shift register and summed or processed through a memory circuit in digital format before being converted to an analog output.

DESCRIPTION OF THE PREFERRED EMBODIMENT

A digital equalizer for high speed communication channels is disclosed wherein the N multipliers 12 of a conventional equalizer are replaced by simple logic circuits. This can be determined by recognizing that the inputs to the multipliers from the storage registers will be single binary bits; a binary 1 or 0 for data and a binary 0 for the B−1 baud intervals between data bits, rather than the C-bit digital words out of the A/D converter when equalizing at the receiver. As a simplification of the circuit of FIG. 1, the receiver equalizer can be replaced by the logic circuit shown in FIG. 2.

Figure 1:
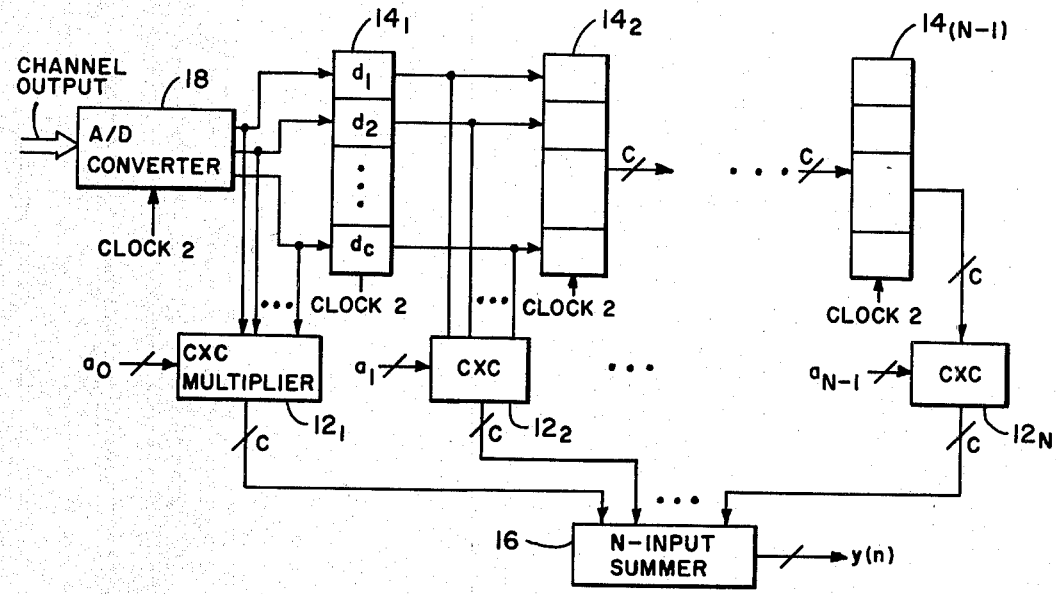
FIG. 1 is a block diagram of a typical prior art transversal equalizer at the receiver of a communication channel.

In the drawings the connecting lines having a slash thereacross represent multiple lines of interconnection, that is, the number of bits per digital word, for example, "C" bits for each of the two inputs and one output assigned to each C×C multiplier 12. The three dots between like components, such as $d_2-d_C$ of FIG. 1 represent the additional like circuit components completing a particular circuit.

Figure 2:
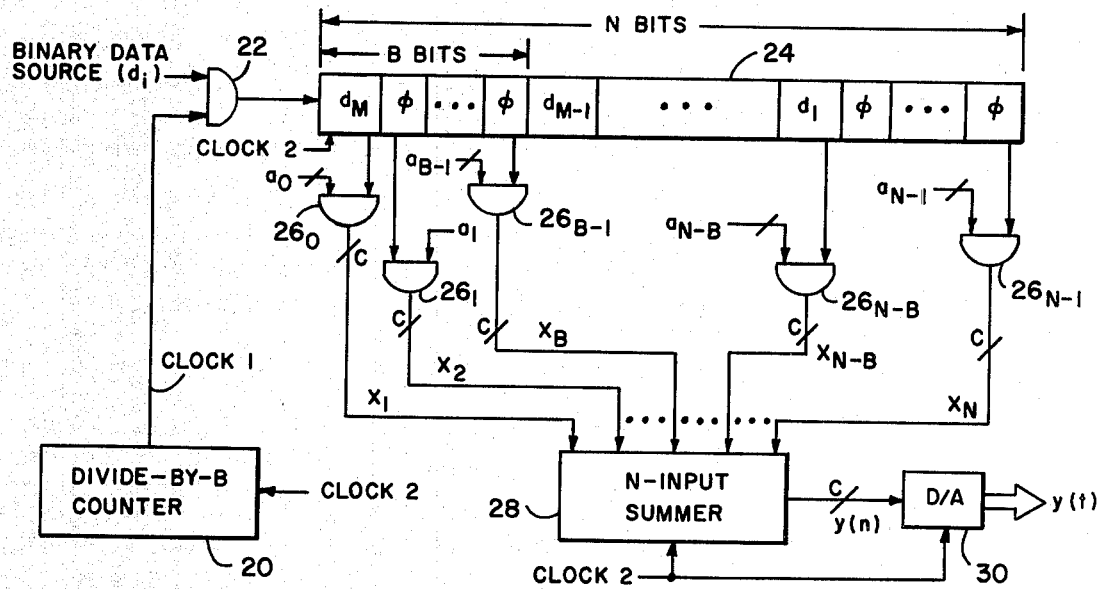
FIG. 2 is a block diagram of a preferred embodiment of a transversal equalizer at the transmitter of a communication channel for providing the same function as the prior art equalizer.

FIG. 2 comprises an N-bit shift register 24, a plurality (C×N) of 2-input AND gates 26, N C-bit coefficient registers (not shown) which provides the coefficients $a_0-a_{N-1}$, and the arithmetic circuit 28, equivalent of an N-input summer, capable of handling inputs of length C-bits. The D/A converter 30 responds to the output of summer 28 to provide an analog function output y(t). The circuit input from a binary data source ($d_i$) is coupled serially to one input of an AND gate 22. Clock 1 provides circuit timing to the gate 22. Clock 2 provides timing to shift register 24, summer circuit 28, and converter 30 for synchronizing system operation. It also is used to generate clock 1, which is B times slower, by driving a Divide-by-B counter 20. The net effect is B−1 zeros placed between two successive data bits, in example, $d_M$ and $d_{M-1}$. This embodiment is a considerable reduction in hardware over the structure of FIG. 1, since the FIG. 1 multipliers represent the majority of the hardware for the receiver equalizer of the prior art structure.

Figure 6:
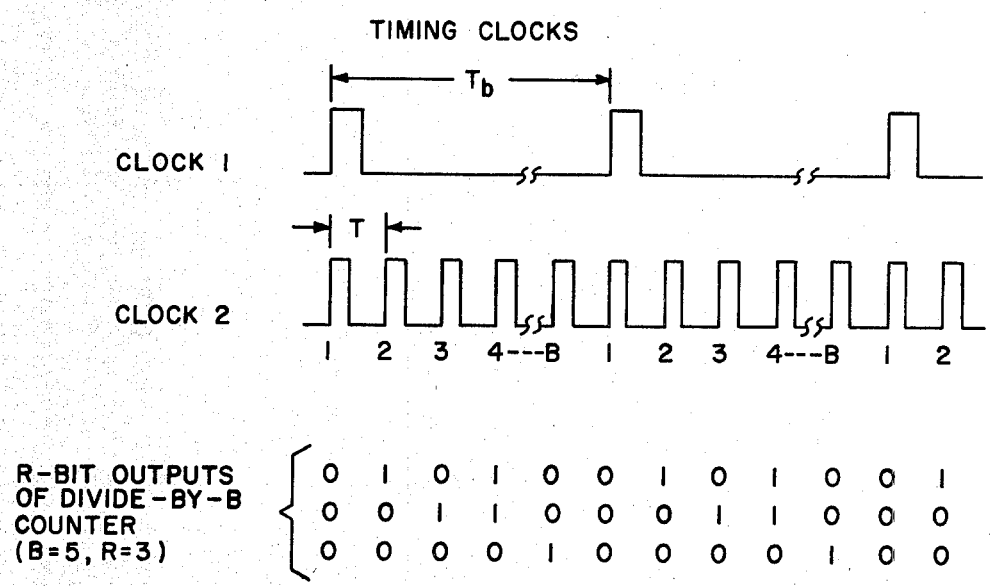
FIG. 6 is a typical timing diagram showing the relationships between clock outputs.

In general, two clocks are present in the system, as is shown in FIG. 6. Clock 1 sends a pulse every $T_b$ seconds and Clock 2 every T seconds. In practice, however, only Clock 2 is needed, Clock 1 being derived by counter 20 which supplies one output pulse for every B input pulses. Counter 20 contains R memory flip-flops (not shown), where R is the smallest integer such that $R \geq \log_2 B$.

Figure 3:
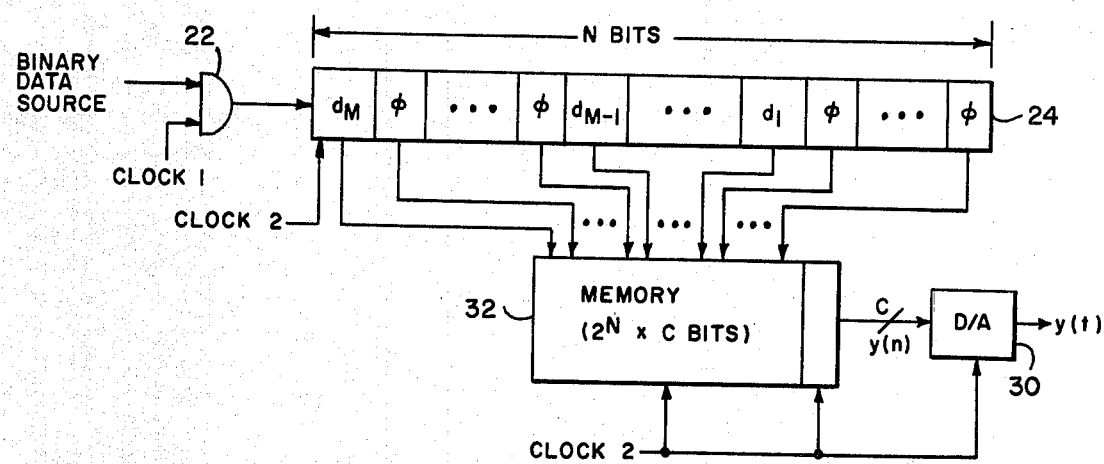
FIG. 3 is a preferred embodiment in block diagram of a transmitter equalizer having a random access memory circuit and timing circuit.

Since the results of the summation in FIG. 2 are completely deterministic for a given set of multiplier coefficients ($a_i$) once the contents of the N-bit shift register are known, a further simplification of the circuit can be made. As shown in FIG. 3, the gate structure 26 and N-input summer 28 are replaced with a memory 32 containing $2^N$ words of length C bits/word. From probability theory, if a word has m bits and each bit can be one of two values (one or zero), then there are $2^m$ possible words. The M binary data bits and N-M interspersed zeros in the shift register form an N-bit address word to select one of the $2^N$ stored words for output to the D/A converter 30 which generates the analog transmission signal y(t). This digital output word y(n) is equal to the C-bit truncated sum of the N input words ($x_i$) to the summer 28 in FIG. 2 which result from the same bit pattern in the shift register. A new output y(n) can be formed every T seconds either by shifting a binary data bit or zero into the left most flip-flop 24 of FIG. 2 or by forming a new address word for memory 32 of FIG. 3.

Figure 4:
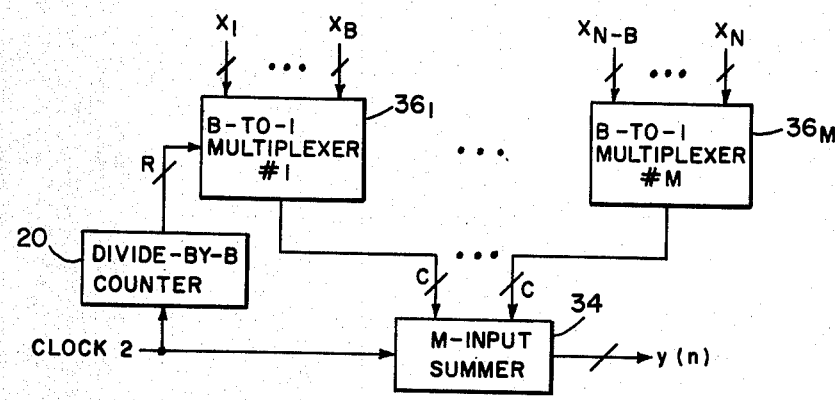
FIG. 4 is an embodiment utilizing multiplexers in the signal processing of the structure of FIG. 2.

As shown in FIG. 4, simplification of the circuit of FIG. 2 results by recognizing that only a subset M of the input words $x_i$ of FIG. 2 are possibly non-zero, specifically $x_j, x_{j+B}, \ldots, x_{j+(M-1)B}$, where $j=1,2,\ldots$, B. The multiplexer 36 input selection is made by using the state of the R flip-flops of the Divide-by-B counter 20 as an address. Only B of the $2^R$ possible states are used. Assuming for example that B is equal to 5, the $\log_2 B = 2.235$. Therefore R, being equal to or greater than $\log_2 B$, is equal to 3. FIG. 6 discloses this R output of counter 20 as the counter responds to the clock 2 input. Thus for the first Clock 2 output shown, the R output is zero-zero-zero.

Replacement of the N-input summer of FIG. 2 with the smaller M-input summer 34 and M (B-to-1) multiplexers 36 of FIG. 4 reduces the circuit hardware. The remainder of the circuitry is identical to that shown in FIG. 2, with inputs to the multiplexers 36 coming from C×N AND gates 26.

Figure 5:
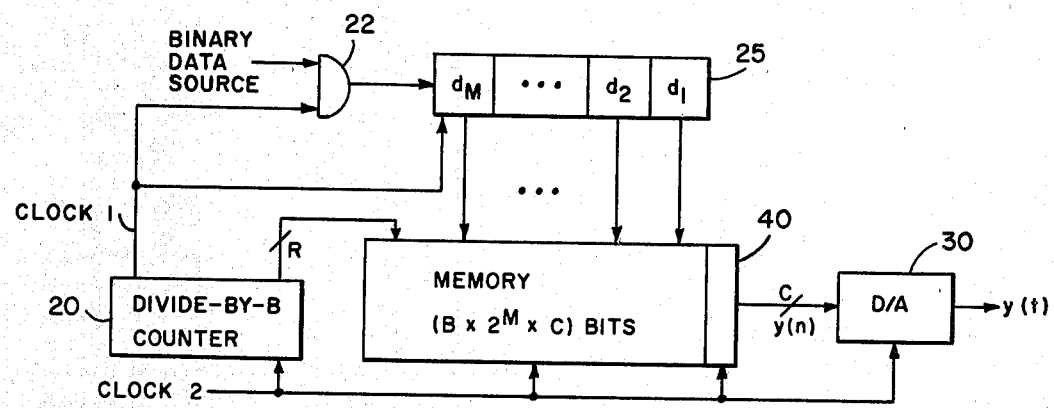
FIG. 5 is a preferred embodiment of the transmitter equalizer of FIG. 3 utilizing a considerably smaller (by a factor of $2^{N-M}/B$) random access memory and timing circuit in providing channel equalization for specified bits.

As may be noted in FIG. 3, the M data ones and zeros spaced B bits apart in the shift register 24 forms one of $2^M$ possible unique addresses. Since there are B possible sets of multipliers associated with a particular M-bit data combination, it follows that a B×$2^M$ word×C bits/word memory may be used. As shown in FIG. 5 this memory 40 replaces the gates 26, multiplexers 36, and summer 34 of FIG. 4 and reduces the shift register 24 from N to M bits. The proper sum y(n) is addressed by M+R bits, where the M bits come from the data buffer 25 and the R bits are obtained from the counter 20 as shown in FIG. 5. The data buffer 25 is the same device as the shift register 24. However, it is of length M rather than N and is clocked at rate of Clock 1 rather than Clock 2.

Typically, assuming C=8 bits, if the equalizer structure shown in FIG. 1 were employed at the receiver, it would require one A/D converter (assuming 4 microsecond/conversion) and N each 8-bit storage registers, dual 4-bit full adders plus the associated carry-look-ahead circuit used in such adders, and 8×8 multiplier chips plus eight N-1 bit shift registers. The data interval $T_b=BT$, that is, a data rate of (250/B) kilohertz.

Moving the equalizer from the receiver to the transmitter and using the configuration of FIG. 2 eliminates the need for an A/D converter and requires one 8-bit D/A converter, N 8-bit storage registers, one N-bit shift register, 8 N 2-input AND gates, one R-bit counter, and the aforementioned N input summer circuitry. This permits a minimum of a 100 fold increase in data throughput rate since the 4 usec conversion time for the A/D converter can be reduced to 40 nsec for the D/A converter.

The alternative arrangement shown in FIG. 5 replaces the N-input summer, and AND gates and storage registers shown in FIG. 2 with B random access memories each one storing all $2^M$ possible summations of M coefficients ($a_i$, i=1,2, ... M) multiplied by the appropriate data bit ($d_i$, i=1,2, ... M). Since there are B such unique summations, the total memory required is B×$2^M$×C bits. Assuming C=8, B=4, and M=6 requires only a 256×8 bit random access memory (RAM). For the systems where the channel characteristics are not subject to change, the RAM can be replaced with a read-only memory (ROM).

The basic unit of system timing (1/T) is used to signal the summer 28, memory 40, shift register 24, multiplexer 36, and D/A converter 30 when to begin operation. As shown in FIG. 2, at the first timing phase (Clock 1) a data bit ($d_i$) is gated by AND gate 22 into shift register 24. Each of the AND gates 26 passes the preset coefficient ($a_i$) into the N input summer 28 only if the corresponding register bit output to that gate is a 1. The sum y(n) is held in a buffer of summer 28 until the beginning of the next timing phase. At the second timing phase (Clock 2) a zero is clocked into register 24 and the previous sum y(n) is transferred to D/A converter 30 where it is converted to an analog pulse output y(t). The maximum baud rate (1/T) is limited by the time required to convert the C bit digital word input into an analog voltage y(t) output. At the end of B timing phases, the timing circuit recycles to timing phase 1 (Clock 1) and a new data bit is clocked into the register.

For the embodiment of FIG. 3, the N-bit register 24 is used to locate the corresponding sum y(n) in the $2^N$×C bit memory 32. This process is faster than the FIG. 2 embodiment requiring only the transfer of shift register 24 contents to the memory 32 followed by a second transfer of the prestored sum from memory 32 to D/A converter 30, as opposed to a cascade of $\log_2 N$ full adder operations to generate the sum, which is then transfered to the D/A converter.

For the embodiment of FIG. 4, the only differences between the operation of the circuit of FIG. 4 and that of FIG. 2 are that the M-input summer is faster by $\log_2 N/\log_2 M$ and a multiplexer 36 address word from the Divide-by-B counter 20 is used to control which of the B inputs to the multiplexers is transferred to the M-input summer 34. Similarly, in FIG. 5 the address previously supplied to the multiplexer 36 is now fed to the memory 40 input. The data buffer 25 is only M bits long and is clocked only on the first timing phase. The proper word from memory is obtained by decoding the M+R bit complete address. The memory word is transferred to the D/A converter 30.

Typically, the data buffer of FIG. 5 is a shift register M bits in length. The shift register of FIGS. 2 and 3 are the same device, only of length N=BM. The components comprising the equalizer are well established, shelf items and can be comprised, typically as follows:

| | |
|---|---|
| Computer Labs 1205 | A/D converter 18 |
| TI 74S374 | Registers 14 |
| TRW MPY-12AJ | Multipliers 12 |
| TI 74S169 | Counter 20 |
| TI 74S299 | Shift registers 24 |
| TI 74S08 | AND gates 26 |
| TI 74S283 | Summer, 16, 28, 34 |
| INTEL 2147 | Memory 32, 40 |
| Analog Devices AD 565 | D/A converter 30 |

While the invention has been described in connection with certain specific embodiments thereof, it will be understood that other modifications will suggest themselves to those skilled in the art and that it is intended to cover such modifications that fall within the scope of the claims appended hereto.

We claim:

1. A digital equalizer for high-speed communication channels comprising: a shift register having an input adapted for receiving a binary data signal and providing a plurality of separate and distinct outputs therefrom in response to said binary data input; summing means having a plurality of inputs and an output; a plurality of multiplexers; and a plurality of AND gates, said AND gates being coupled respectively between said multiplexers and respective outputs of said shift register for providing a gated or controlled output from each of said respective shift register outputs to said multiplexers; each of said AND gates having a first input coupled to a respective shift register output and having a second input adapted for receiving a controlling signal input to initiate passage of register data to said multiplexers; and said multiplexers being coupled between preselected sequential outputs of said AND gate outputs and said summing means inputs, each of said multiplexers having a plurality of inputs and a single output and disposed for sequentially receiving a selected number of said AND gate outputs indicative of signals received for a predetermined timed interval, each AND gate having a single output coupled to provide a single input to a multiplexer, said multiplexers outputs being coupled to said summing circuit.

2. A digital equalizer as set forth in claim 1 wherein said register is an N bit shift register, and further comprising an 2-input AND gate coupled to said shift register input for receiving binary data and coupling said data to said register in response to a clocked input signal.

3. A digital equalizer as set forth in claim 2 wherein said summing means is a memory circuit, adapted for selectively summing said shift register outputs, which has prestored therein all possible summing combinations of said register outputs multiplied by equalizer coefficients.

4. A digital equalizer as set forth in claim 3 wherein said summing means is a random access memory circuit.

5. A digital equalizer as set forth in claim 3 wherein said summing means is a read only memory circuit.

* * * * *